(12) United States Patent
Pope et al.

(10) Patent No.: US 9,948,533 B2
(45) Date of Patent: Apr. 17, 2018

(54) INTERRUPT MANAGEMENT

(71) Applicant: Solarflare Communications, Inc., Irvine, CA (US)

(72) Inventors: Steven L. Pope, Costa Mesa, CA (US); David J. Riddoch, Huntingdon (GB)

(73) Assignee: Solarflare Communitations, Inc., Irvine, CA (US)

( * ) Notice: Subject to any disclaimer, the term of this patent is extended or adjusted under 35 U.S.C. 154(b) by 496 days.

(21) Appl. No.: 13/722,841

(22) Filed: Dec. 20, 2012

(65) Prior Publication Data

US 2014/0012980 A1 Jan. 9, 2014

Related U.S. Application Data

(63) Continuation-in-part of application No. 12/373,173, filed as application No. PCT/IB2007/003444 on Jul. 9, 2007, now Pat. No. 8,489,761.

(30) Foreign Application Priority Data

| Jul. 10, 2006 | (GB) | .................................... 0613684.0 |
| Jul. 10, 2006 | (GB) | .................................... 0613687.3 |
| Jul. 13, 2006 | (GB) | .................................... 0613976.0 |

(51) Int. Cl.
*G06F 15/173* (2006.01)
*H04L 12/26* (2006.01)
*H04L 12/24* (2006.01)

(52) U.S. Cl.
CPC ...... *H04L 43/0876* (2013.01); *H04L 41/0622* (2013.01)

(58) Field of Classification Search
CPC . H04L 12/2602; H04L 12/5695; H04L 41/06; H04L 41/0622; H04L 43/00;
(Continued)

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
EP 2552080 A2 1/2013
(Continued)

OTHER PUBLICATIONS

EP 13169223.8-1505, Extended European Search Report, dated Mar. 20, 2014, 16 pages.
(Continued)

*Primary Examiner* — Tauqir Hussain
*Assistant Examiner* — Austin Moreau
(74) *Attorney, Agent, or Firm* — Haynes Beffel & Wolfeld LLP

(57) ABSTRACT

A method for use in a data processing system connected to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the method comprising: deciding whether to permit the interrupts to be enabled, in dependence on the result of a determination as to the presence of current indications that the stack will be invoked by an entity in the data processing system to cause processing in accordance with the data transfer protocol of network events on the event queues.

16 Claims, 4 Drawing Sheets

(58) Field of Classification Search
CPC ..... H04L 43/50; H04L 43/0876; H04L 47/30; H04L 49/90; H04L 49/9073
See application file for complete search history.

(56) References Cited

U.S. PATENT DOCUMENTS

| | | | |
|---|---|---|---|
| 5,946,189 A | 8/1999 | Koenen et al. | |
| 6,098,112 A | 8/2000 | Ishijima et al. | |
| 6,160,554 A | 12/2000 | Krause | |
| 6,226,680 B1 | 5/2001 | Boucher et al. | |
| 6,247,068 B1 | 6/2001 | Kyle | |
| 6,304,945 B1 | 10/2001 | Koenen | |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,907,042 B1 | 6/2005 | Oguchi | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,263,568 B2 * | 8/2007 | Shah | G06F 13/24 370/412 |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,424,710 B1 | 9/2008 | Nelson et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,838 B1 | 3/2010 | Aloni et al. | |
| 7,688,853 B2 | 3/2010 | Santiago et al. | |
| 7,742,473 B2 | 6/2010 | Adams et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 8,341,636 B2 * | 12/2012 | Wilhelm, Jr. | 718/104 |
| 8,478,907 B1 | 7/2013 | Aloni et al. | |
| 9,417,942 B1 | 8/2016 | Venkataraman et al. | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0012168 A1 | 1/2003 | Elson et al. | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0081601 A1 | 5/2003 | Morris et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2003/0223425 A1 | 12/2003 | Shenoy et al. | |
| 2004/0049621 A1 * | 3/2004 | Singh et al. | 710/260 |
| 2004/0071250 A1 | 4/2004 | Bunton et al. | |
| 2004/0111549 A1 * | 6/2004 | Connor | G06F 13/24 710/260 |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0021680 A1 | 1/2005 | Ekis et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066060 A1 | 3/2005 | Pinkerton et al. | |
| 2005/0066333 A1 | 3/2005 | Krause et al. | |
| 2005/0172181 A1 | 8/2005 | Huliehel | |
| 2005/0210479 A1 | 9/2005 | Andjelic | |
| 2005/0219278 A1 | 10/2005 | Hudson | |
| 2005/0219314 A1 | 10/2005 | Donovan et al. | |
| 2005/0223134 A1 | 10/2005 | Vasudevan et al. | |
| 2005/0231751 A1 | 10/2005 | Wu et al. | |
| 2005/0281286 A1 | 12/2005 | Wang et al. | |
| 2006/0026443 A1 | 2/2006 | McMahan et al. | |
| 2006/0045090 A1 * | 3/2006 | Ronciak | H04L 12/5693 370/392 |
| 2006/0045098 A1 | 3/2006 | Krause | |
| 2006/0075119 A1 * | 4/2006 | Hussain | H04L 49/90 709/227 |
| 2006/0104295 A1 * | 5/2006 | Worley et al. | 370/401 |
| 2006/0104308 A1 | 5/2006 | Pinkerton et al. | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2006/0259661 A1 | 11/2006 | Feng et al. | |
| 2007/0188351 A1 | 8/2007 | Brown et al. | |
| 2007/0220183 A1 | 9/2007 | Kagan et al. | |
| 2008/0024106 A1 | 1/2008 | Barron | |
| 2008/0059677 A1 * | 3/2008 | Archer et al. | 710/262 |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0140896 A1 * | 6/2008 | Todoroki | G06F 13/26 710/264 |
| 2008/0147828 A1 | 6/2008 | Enstone et al. | |
| 2008/0148400 A1 | 6/2008 | Barron et al. | |
| 2008/0177890 A1 | 7/2008 | Krause et al. | |

(56) References Cited

U.S. PATENT DOCUMENTS

| | | | |
|---|---|---|---|
| 2008/0240130 A1 | 10/2008 | Oved | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0177828 A1* | 7/2009 | Almasi | G06F 9/4812 710/266 |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0017811 A1 | 1/2010 | Sng | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |
| 2013/0111059 A1 | 5/2013 | Pope et al. | |

FOREIGN PATENT DOCUMENTS

| | | |
|---|---|---|
| EP | 2552081 A2 | 1/2013 |
| EP | 2632109 A2 | 8/2013 |
| EP | 2645674 A1 | 10/2013 |
| WO | 00/41358 A2 | 7/2000 |
| WO | 2000-41358 A2 | 7/2000 |
| WO | 2001048972 A1 | 7/2001 |
| WO | 2002035838 A1 | 5/2002 |
| WO | 2005-074611 A2 | 8/2005 |
| WO | 2005-104475 A2 | 11/2005 |
| WO | 2008127672 A2 | 10/2008 |
| WO | 2009136933 A1 | 11/2009 |
| WO | 20090134219 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

EP 12189774.8 Search Report dated May 31, 2013.
Microsoft Windows Scalable Networking Initiative, WInHEC 2004 Version, Apr. 13, 2004, Microsoft Corporation, 12 pages.
Scalable Networking: Network Protocol Offload—Introducing TCP Chimney, WinHEC 2004 Version, Micorsoft Corporation 2004, 30 pages.
EP 12189776.3 Search Report dated May 31, 2013.
Druschel et al. "Lazy Receiver Processing (LRP): A Network Subsystem Architecture for Server Systems," OSDI '96 Proceedings of the Second USENIX Symposium on Operating Systems Design and Implementation, pp. 261-275, New York, NY, USA (1996).
"HDK Technical Reference," OpenServer 6 and Unixware (SVR5) HDK, Apr. 1, 2005, pp. 1-173.
Banga, G. et al., "A Sand Explicit Event Delivery Mechanism for UNIX," The USENIX Association, In Proceedings of the USENIX Annual Technical Conference, 1999, 14 pages.
Langendoen, K. et al., "Integrating Polling, Interrupts, and Thread Management," IEEE Computer Society, In Proceedings of the 6th Symposium on the Frontiers of Massively Parallel Computation, 1996, pp. 13-22.
EP-13174385.8—Extended European Search Report dated Aug. 6, 2013, 8 pages.
Speight et al: "WSDLite: A Lightweight Alternative to Windows Sockets Direct Path", Proceedings of the 4th USENIX Windows Systems Symposium, Aug. 4, 2000 (Aug. 4, 2000), pp. 113-124.
Microsoft: "Windows Platform Design Notes: Winsock Direct and Protocol Offload on SANs", Mar. 3, 2001 (Mar. 3, 2001), pp. 1-8.
Pradhan P et al., "Daytona: A User-Level TCP Stack," online report, 2002, retrieved from the Internet: URL:http://nms.csail.mit.edu/~kandula/data/daytona.pds [retrieved Jun. 20, 2008], 8 pages.
International Search Report dated Sep. 19, 2008 for PCT/IB2007/003444.
Supplementary European search report dated Oct. 10, 2007 for EP 05712621.1.
Dixon JT et al., "Tuning TCP and UDP Demultiplexing," Georgia Institute of Technology, CC Technical Report GIT-CC-09-09, 1998, 36 pp.
International Preliminary Report on Patentability, Chapter I, dated May 2, 2008 in PCT/GB2006/003828.
Gordon E. Moore; Electronics, vol. 38, No. 8, pp. 114-117, 1965, Apr. 19, 1965.
Jack B. Dennis and Earl C. Van Horn; Communications of the ACM, vol. 9, No. 3, pp. 143-155, 1966, Mar. 1966.
Marvin Zelkowitz; Communications of the ACM, vol. 14, No. 6, p. 417-418, 1971, Jun. 1971.
J. Carver Hill; Communications of the ACM, vol. 16, No. 6, p. 350-351, 1973, Jun. 1973.
Vinton Cerf, Robert Kahn; IEEE Transactions on Communications, vol. COM-22, No. 5, pp. 637-648, 1974, May 1974.
V. Cerf, et al.; ACM Computer Communication Review, vol. 6 No. 1, p. 1-18, 1976, Jan. 1976.
Robert M. Metcalfe and David R. Boggs; Communications of the ACM, vol. 19, Issue 7, pp. 395-404, 1976, Jul. 1976.
P. Kermani and L. Kleinrock; Computer Networks, vol. 3, No. 4, pp. 267-286, 1979, Sep. 1979.
John M. McQuillan, et al.; Proceedings of the 6th Data Communications Symposium, p. 63, 1979, Nov. 1979.
Andrew D. Birrell, et al.; Communications of the ACM, vol. 25, Issue 4, pp. 260-274, 1982, Apr. 1982.
Ian M. Leslie, et al.; ACM Computer Communication Review, vol. 14, No. 2, pp. 2-9, 1984, Jun. 1984.
John Nagle; ACM Computer Communication Review, vol. 14, No. 4, p. 11-17, 1984, Oct. 1984.
Christopher A. Kent, Jeffrey C. Mogul; ACM Computer Communication Review, vol. 17, No. 5, pp. 390-401, 1987, Oct. 1987.
Gary S. Delp, et al.; ACM Computer Communication Review, vol. 18, No. 4, p. 165-174, 1988, Aug. 1988.
David R. Boggs, et al.; ACM Computer Communication Review, vol. 18, No. 4, p. 222-234, 1988, Aug. 1988.
H. Kanakia and D. Cheriton; ACM Computer Communication Review, vol. 18, No. 4, p. 175-187, 1988, Aug. 1988.
V. Jacobson; ACM Computer Communication Review, vol. 18, No. 4, p. 314-329, 1988, Aug. 1988.
David D. Clark; ACM Computer Communication Review, vol. 18, No. 4, pp. 106-114, 1988, Aug. 1988.
Paul V. Mockapetris, Kevin J. Dunlap; ACM Computer Communication Review, vol. 18, No. 4, pp. 123-133, 1988, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, 1989, Apr. 1989.
R. Braden, et al.; ACM Computer Communication Review, vol. 19, No. 2, p. 86-94, 1989, Apr. 1989.
David D. Clark, et al.; IEEE Communications Magazine, vol. 27, No. 6, pp. 23-29, 1989, Jun. 1989.
David R. Cheriton; ACM Computer Communication Review, vol. 19, No. 4, p. 158-169, 1989, Sep. 1989.

(56) References Cited

OTHER PUBLICATIONS

Craig Partridge; ACM Computer Communication Review, vol. 20, No. 1, p. 44-53, 1990, Jan. 1990.
D. D. Clark and D. L. Tennenhouse; ACM Computer Communication Review, vol. 20, No. 4, pp. 200-208, 1990, Sep. 1990.
Eric C. Cooper, et al.; ACM Computer Communication Review, vol. 20, No. 4, p. 135-144, 1990, Sep. 1990.
C. Brendan S. Traw, et al.; ACM Computer Communication Review, vol. 21, No. 4, p. 317-325, 1991, Sep. 1991.
Ian Leslie and Derek R. McAuley; ACM Computer Communication Review, vol. 21, No. 4, p. 327, 1991, Sep. 1991.
Mark Hayter, Derek McAuley; ACM Operating Systems Review, vol. 25, Issue 4, p. 14-21, 1991, Oct. 1991.
Gregory G. Finn; ACM Computer Communication Review, vol. 21, No. 5, p. 18-29, 1991, Oct. 1991.
Gene Tsudik; ACM Computer Communication Review, vol. 22, No. 5, pp. 29-38, 1992, Oct. 1992.
C. Traw and J. Smith; IEEE Journal on Selected Areas in Communications, pp. 240-253, 1993, Feb. 1993.
Jonathan M. Smith and C. Brendan S. Traw; IEEE Network, vol. 7, Issue 4, pp. 44-52, 1993, Jul. 1993.
Jonathan Kay and Joseph Pasquale; ACM Computer Communication Review, vol. 23, No. 4, pp. 259-268, 1993, Oct. 1993.
W. E. Leland, et al.; ACM Computer Communication Review, vol. 23, No. 4, p. 85-95, 1993, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, 1993, Dec. 1993.
Matthias Kaiserswerth; IEEE/ACM Transactions on Networking, vol. 1, No. 6, p. 650-663, 1993, Dec. 1993.
Chris Maeda, Brian Bershad; ACM Operating Systems Review, vol. 27, Issue 5, p. 244-255, 1993, Dec. 1993.
Greg Regnier, et al.; IEEE Micro, vol. 24, No. 1, p. 24-31, 1994, Jan. 1994.
J. Vis; ACM Computer Communication Review, vol. 24, No. 1, pp. 7-11, 1994, Jan. 1994.
Stuart Wray, et al.; Proceedings of the International Conference on Multimedia Computing and Systems, p. 265-273, Boston, 1994, May 1994.
Raj K. Singh, et al.; ACM Computer Communication Review, vol. 24, No. 3, p. 8-17, 1994, Jul. 1994.
Sally Floyd; ACM Computer Communication Review, vol. 24, No. 5, p. 8-23, 1994, Oct. 1994.
A. Edwards, et al.; ACM Computer Communication Review, vol. 24, No. 4, pp. 14-23, 1994, Oct. 1994.
L. S. Brakmo, et al.; ACM Computer Communication Review, vol. 24, No. 4, p. 24-35, 1994, Oct. 1994.
A. Romanow and S. Floyd; ACM Computer Communication Review, vol. 24, No. 4, p. 79-88, 1994, Oct. 1994.
R. J. Black, I. Leslie, and D. McAuley; ACM Computer Communication Review, vol. 24, No. 4, p. 158-167, 1994, Oct. 1994.
Babak Falsafi, et al.; Proceedings of the 1994 conference on Supercomputing, pp. 380-389, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, 1995, Oct. 1995.
C. Partridge, J. Hughes, J. Stone; ACM Computer Communication Review, vol. 25, No. 4, p. 68-76, 1995, Oct. 1995.
Thorsten von Eicken, et al.; ACM Operating Systems Review, vol. 29, Issue 5, p. 109-126, 1995, Dec. 1995.
D. L. Tennenhouse, D. J. Wetherall; ACM Computer Communication Review, vol. 26, No. 2, pp. 15-20, 1996, Apr. 1996.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, 1997, Jul. 1997.

Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
M. de Vivo, et al.; ACM Computer Communication Review, vol. 29, No. 1, pp. 81-85, 1999, Jan. 1999.
U.S. Appl. No. 13/720,770—Office Action dated Feb. 20, 2015, 83 pages.
U.S. Appl. No. 12/373,173—Response to Office Action dated Aug. 13, 2012 filed Jan. 14, 2013, 19 pages.
U.S. Appl. No. 12/373,173—Notice of Allowance dated Apr. 4, 2013, 12 pages.
EP 13174385.8—Office Action dated Jan. 29, 2015, 6 pages.
EP 13174385.8—Response to Office Action dated Jan. 29, 2015 filed Jul. 30, 2015, 22 pages.
U.S. Appl. No. 13/720,770—Response to Office Action dated Feb. 20, 2015 filed Aug. 13, 2015, 24 pages.
Kim et al., "Connection Handoff Policies for TCP Offload Network Interfaces", 7th Symposium on Operating Systems Design and Implementation, Nov. 6-8, 2006, Seattle, WA, Usenix Association, US, Apr. 18, 2006, 14 pages.
EP 07858875.3—Response to communication pursuant to Article 94(2) EPC, dated Jun. 4, 2012, filed Oct. 15, 2012, 13 pages.
EP 07858875.3—Invitation pursuant to Article 94(3) and Rule 71(1) EPC, dated May 3, 2013, 2 pages.
EP 07858875.3—Communication pursuant to Article 94(3) EPC, dated Jun. 30, 2011, 6 pages.
EP 07858875.3—Response to Communication dated Jun. 30, 2011, filed Dec. 23, 2011, 8 pages.
EP 12189774.8—Communication pursuant to Article 94(3) EPC, dated Jan. 23, 2015, 9 pages.
EP 12189774.8—Response to Communication pursuant to Article 94(3) EPC, dated Jan. 23, 2015, filed Jun. 19, 2015, 20 pages.
EP 12189774.8—Summons to attent oral proceedings pursuant to Rule 115(1) EPC, dated Apr. 26, 2016, 10 pages.
EP 12189776.3—European Search Report dated May 31, 2013, 7 pages.
EP 12189776.3—Communication under Rule 71(3) EPC, dated Jan. 28, 2015, 5 pages.
EP 12189776.3—Decision to grant a European patent pursuant to Artucle 97(1) EPC, dated May 21, 2015, 2 pages.
EP 13169223.8—Invitation Pusuant to Rule 63(1) EPC, dated Nov. 2013, 5 pages.
EP 13169223.8—Response to EP Search, dated Oct. 23, 2014, 33 pages.
EP 13169223.8—Communicaiton pursuant to Article 94(3) EPC, dated Feb. 19, 2015, 8 pages.
EP 13169223.8—Response to Article 94(3), dated Aug. 17, 2015, 21 pages.
EP 13169223.8—Summons to attend oral proceedings pursuant to Rule 115(1) EPC, Apr. 26, 2016, 11 pages.
U.S. Appl. No. 13/720,770—Final Office Action dated Nov. 6, 2015, 28 pages.
U.S. Appl. No. 13/720,770—Response to Final Office Action dated Nov. 6, 2015 Feb. 3, 2016, 21 pages.
U.S. Appl. No. 13/720,770—Office Action dated Mar. 31, 2016, 17 pages.
U.S. Appl. No. 13/720,770—Response to Mar. 31 Office Action filed Jun. 30, 2016, 17 pages.
U.S. Appl. No. 13/720,770—Final Office Action dated Sep. 15, 2016, 14 pages.
U.S. Appl. No. 13/720,770—Response to Final Office Action dated Sep. 15, 2016 filed Jan. 3, 2017, 18 pages.

(56) References Cited

OTHER PUBLICATIONS

U.S. Appl. No. 12/373,173—Preliminary Amendment dated Jan. 9, 2009, 11 pages.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, 1980, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Jun. 4, 2012 examination report for EP 07 858 875, 2pp.
Office Action dated Aug. 13, 2012 in U.S. Appl. No. 12/373,173 20 pp. w/o attachments.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, 2000, Oct. 2000.
W. Feng and P. Tinnakomsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, 2001, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, 2002, Jan. 2002.
Murali Rangarajan, et al.; Technical Report DCR-TR-481, Computer Science Department, Rutgers University, 2002. , Mar. 2002.
Jon Crowcroft, Derek McAuley; ACM Computer Communication Review, vol. 32, No. 5, 2002, Nov. 2002.
Charles Kalmanek; ACM Computer Communication Review, vol. 32, No. 5, pp. 13-19, 2002, Nov. 2002.
Jonathan Smith; ACM Computer Communication Review, vol. 32, No. 5, pp. 29-37, 2002, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, 2003, Apr. 2003.
Tom Kelly; ACM Computer Communication Review, vol. 33, No. 2, pp. 83-91, 2003, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, 2003, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, 2004, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, 2005, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005, Sep. 2005.
P. Balaji, et al.; Proceedings of the IEEE International Conference on Cluster Computing, 2005, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, 2006, Jan. 2006.
H. K. Jerry Chu; Proceedings of the USENIX Annual Technical Conference 1996, Jan. 1996.
Ken Calvert; ACM Computer Communication Review, vol. 36, No. 2, pp. 27-30, 2006, Apr. 2006.
Jon Crowcroft; ACM Computer Communication Review, vol. 36, No. 2, pp. 51-52, 2006, Apr. 2006.
Greg Minshall, et al.; ACM Computer Communication Review, vol. 36, No. 3, pp. 79-92, 2006, Jul. 2006.
David Wetherall; ACM Computer Communication Review, vol. 36, No. 3, pp. 77-78, 2006, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, 1993, Dec. 1993.
Danny Cohen, et al.; ACM Computer Communication Review, vol. 23, No. 4, p. 32-44, 1993, Jul. 1993.
Kuo, F.F., "The ALOHA System," ACM Computer Communication Review, vol. 4 No. 1, 1974, Jan. 1974, pp. 63-65.
Brandriff, Robert K., et al.; "Development of a TCP/IP for the IBM/370," ACM SIGCOMM Computer Communication Review, vol. 15, No. 4, 1985, Sep. 1985, pp. 2-8.
Kline, C., "Supercomputers on the internet: a case study," ACM Computer Communication Review, vol. 17, No. 5, 1987, Aug. 1987, pp. 27-33.
McAuley, Derek Robert, "Protocol Design for High Speed Networks," Ph.D. Thesis, University of Cambridge, 1989, Sep. 1989, 104 pp.

(56) References Cited

OTHER PUBLICATIONS

Davie, Bruce S., "A host-network interface architecture for ATM," ACM Computer Communication Review, vol. 21, No. 4, 1991, Sep. 1991, pp. 307-315.
Greg Chesson, "The Evolution of XTP," Proceedings of the Third International Conference on High Speed Networking, 1991, Nov. 1991, 10 pp.
Dixon, Michael J., "System support for multi-service traffic," University of Cambridge Computer Laboratory Technical Report No. 245, Jan. 1992, 113 pp.
Cohen, et al., "ATOMIC: A Local Communication Network Created through Repeated Application of Multicomputing Components," Universti of Southern California, Oct. 1, 1992, 11 pages.
Steenkiste, Peter, "Analyzing communication latency using the Nectar communication processor," ACM Computer Communication Review, vol. 22, No. 4, 1992, Oct. 1992, pp. 199-209.
McKenney, Paul E. and Dove, Ken F., "Efficient demultiplexing of incoming TCP packets," ACM Computer Communication Review, vol. 22, No. 4, 1992, Oct. 1992, pp. 269-279.
Rutsche, et al., "TCP/IP on the parallel protocol engine," Proceedings of the IFIP TC6/WG6, 4 Fourth International Conference on High Performance Networking IV, Dec. 14, 1992, pp. 119-134.
Rutsche, E., "The architecture of a Gb/s multimedia protocol adapter," ACM Computer Communication Review, vol. 23, No. 3, 1993, Jul. 1993, pp. 59-68.
Michel, Jeffrey R., "The Design and Evaluation of an Off-Host Communications Protocol Architecture," M.Sci. Thesis, University of Virginia, 1993, Aug. 1993, 139 pp.
Hayter, Mark David, "A Workstation Architecture to Support Multimedia," Ph.D. Thesis, University of Cambridge, 1993, Sep. 1993, 111 pp.
Thekkath, C. A., et al., "Implementing network protocols at user level," ACM Computer Communication Review, vol. 23, No. 4, 1993, Oct. 1993, pp. 64-73.
Cohen et al., "ATOMIC: A High Speed Local Communication Architecture," Journal of High Speed Networks, vol. 3:1 (1994), pp. 1-21.
Finn, Gregory G. and Mockapetris, Paul, "Netstation Architecture Multi-Gigabit Workstation Network Fabric," Proceedings of InterOp '94, Las Vegas, Nevada, May 1994, 9pp.
"MPI: A Message-Passing Interface Standard," various forum members, Message-Passing Interface Forum, University of Tennessee, Knoxville, 1994, May 5, 1994 (corrected version), 239 pp.
Druschel, et al., "Experiences with a high-speed network adaptor a software perspective,"ACM SIGCOMM Conference on Communications Architectures,Protocols and Applications, 19 pages.
Lin et al., "Performance of High-Speed Network I/O Subsystems: Case Study of A Fibre Channel Network," Proc.1994 Conf. on Supercomputing, Washington D.C., Nov. 14, 1994, 35 pages.
Edwards, et al. "Experiences implementing a high performance TCP in user-space," ACM Computer Communication Review, vol. 25, No. 4, 1995, Oct. 1995, 10 pages.
Mogul, J. C., "The case for persistent-connection HTTP," ACM Computer Communication Review, vol. 25, No. 4, 1995, Oct. 1995, 16 pages.
Barham, Paul Ronald, "Devices in a Multi-Service Operating System," Ph.D. thesis, University of Cambridge, 1996, Jul. 1996, 142pp.
Chang, Chi-Chao, et al., "Low-Latency Communication on the IBM RISC System/6000 SP," Proc. 1996 ACM/IEEE conference on Supercomputing, Pittsburgh, Nov. 17, 1996, 17pp.
Warren, Michael S., et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
Salmon, John, et al., "Scaling of Beowulf-class Distributed Systems," Proc. 1998 ACM/IEEE conference on Supercomputing, Orlando, Florida, Nov. 7, 1998, 18pp.
Chiou, et al., "StarT-Voyager. A Flexible Platform for Exploring Scalable SMP Issues," Proc. 1998 ACM/IEEE conference on Supercomputing, Orlando, Florida, Nov. 7, 1998, 20pp.

Pope, S. L., et al., "Enhancing Distributed Systems with Low-Latency Networking," Parallel and Distributed Computing and Networks, Brisbane, Australia, 1998, Dec. 1998, 10pp.
Allman, M., "TCP Byte Counting Refinements," ACM Computer Communication Review, vol. 29, No. 3, 1999, Jul. 1999, pp. 14-22.
Muir, Steve and Smith, Jonathan, "Piglet: A Low-Intrusion Vertical Operating System," Technical Report MS-CIS-00-04, University of Pennsylvania, 2000, Jan. 2000, 15pp.
Feng, W. and Tinnakornsrisuphap, P., "The Failure of TCP in High-Performance Computational Grids," Proc. 2000 ACM/IEEE conference on Supercomputing, Dallas, Texas, Nov. 4, 2000, 11p.
Hsieh, Jenwei, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.
Blanton E. and Allman, M., "On Making TCP More Robust to Packet Reordering," ACM Computer Communication Review, vol. 32, No. 1, 2002, Jan. 2002, pp. 20-30.
Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.
Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.
Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.
Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
McAuley, Derek and Neugebauer, Rolf, "A case for virtual channel processors," Niceli '03 Proc.Of the ACM SIGCOMM workshop, Aug. 2003, pp. 237-242.
Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).
Currid, Andy, "TCP Offload to the Rescue," ACM Queue, vol. 2, No. 3, 2004, May 1, 2004, pp. 58-65.
Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp. including exhibits (declaration is 25 pp).
Lazowska, Edward D. and Patterson, David A., "Computing Research: A Looming Crisis," ACM Computer Communication Review, vol. 35, No. 2, 2005, Jul. 2005, pp. 65-68.
Leslie, B., et al., "User-level Device Drivers: Achieved Performance," J. Comput. Sci. & Technol., vol. 20, Sep. 2005, Sep. 2005, 17pp.
Balaji, P., et al., "Head-to Toe Evaluation of High-Performance Sockets over Protocol Offload Entines," Proceedings of the IEEE International Conference on Cluster Computing, 2005, Sep. 2005, 10pp.
Geoffray, Patrick, "A Critique of RDMA," HPCWire article, Aug. 18, 2006, 7pp. Available at http://www.hpcwire.com/hpcwire/2006-08-18/a_critique_of_rdma-1.html, 17 pages.
Sancho, Jose Carlos, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.
Sur, et al., "High-Performance and Scalable MPI over InfiniBand with Reduced Memory Usage: An In-Depth Performance Analysis,"

(56) References Cited

OTHER PUBLICATIONS

Proceedings of the 2006 ACM/IEEE conference on Supercomputing, Tampa, Florida, Nov. 11, 2006, 13 pages.
Evans, et al., "The End of History," University of Kansas, Gigabit Networking Workshop, Apr. 22, 2001, 10 pages.
EP 07858875.3—Communication pursuant to Article 94(2) EPC, dated Jun. 4, 2012, 10 pages.
U.S. Appl. No. 13/720,770—Notice of Allowance dated Feb. 1, 2017, 22 pages.

* cited by examiner

INTERRUPT MANAGEMENT

CROSS-REFERENCE TO RELATED APPLICATIONS

This application is a Continuation-In-Part of U.S. application Ser. No. 12/373,173, filed Jun. 12, 2009, which is incorporated herein by reference in its entirety.

BACKGROUND

The present invention relates to a method and system for processing data, and in particular it relates to processing data in accordance with a data transfer protocol.

FIG. 1 represents elements of a computer system capable of implementing a conventional protocol stack, such as a transmission control protocol (TCP) stack in a computer connected to a network. The computer system includes an application 101, a socket 102 and an operating system 103 incorporating a kernel 104. A network interface such as a network interface card (NIC) 106 is provided for interfacing between the computer system and the network. The socket 102 connects the application to a remote entity by means of a network protocol, in this example TCP/IP. The application can send and receive TCP/IP messages by opening a socket and reading and writing data to and from the socket, and the operating system causes the messages to be transported across the network via the NIC. One socket is typically provided for each network endpoint with which an application wishes to communicate. The application can invoke a system call (syscall) for transmission of data onto the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource within the context of a process. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. A system call when invoked causes the operating system to execute algorithms which are specific to the file descriptor identified in the syscall.

In the context of networking, syscalls are used by applications to invoke a stack to send data, and to consume data that has been received, optionally blocking until more data arrives. In this context, a stack is a set of software and/or hardware resources that implement a collection of sockets. Other system calls are used for control plane operations such as creating and destroying sockets, connecting to remote endpoints, and querying the state of sockets.

In a typical network arrangement packets arriving at a NIC are delivered into buffers in host memory, and a notification is sent, in the form of a communication to the NIC's device driver in the operating system kernel. The communication channel by which this communication is delivered typically consists of a queue of notifications that may include notifications of other types of events, including successful transmission of outgoing packets. This communication channel is referred to in the following description as an event queue.

When network events are occurring in the computer system, at some point the device driver must process the event queue by inspecting each event notification and processing the received packets. It is desirable that this happen promptly, since undue delay in the processing of received packets may delay the progress of applications, or may cause the link to go idle. In conventional systems the processing of the event queue is invoked by way of an interrupt generated by the NIC at the time that the event is delivered to the event queue.

An interrupt causes the CPU to save the state of whatever process is currently running, and switch control to an interrupt service routine. This routine processes the event queue, and carries out network processing for the received packets. Thus network processing is carried out in a timely manner and at high priority in response to packet arrival.

A disadvantage of this mechanism is that interrupts incur high overhead due to the requirement to save and subsequently restore the state of the running process, and to interact with the hardware, and due to the impact on the memory caches in the processor.

It is widely known that performance can be improved by reducing the rate at which interrupts are invoked. One means by which this can be achieved is interrupt moderation, which imposes a minimum time gap between each interrupt. This may delay the processing of received packets slightly, but it means that the overheads of an interrupt are effectively spread over a larger number of event notifications.

Another means to reduce overheads due to interrupts is "Lazy Receiver Processing", discussed at http: (slash) (slash) www.cs.rice.edu/CS/Systems/LRP/final.html in an article entitled Lazy Receiver Processing: A Network Subsystem Architecture for Server Systems by Peter Druschel and Gaurav Banga. In this model interrupts are not enabled by default. Instead any outstanding event notifications in the event queue are processed when the stack is invoked by the application via a system call. Thus received packets are processed promptly provided the application invokes the stack frequently. When the application is blocked waiting to send or receive on a socket it is not available to process the event queue. To ensure that events will still be handled at this time, interrupts are enabled and the event queue is processed in the conventional way.

A problem with the Lazy Receiver Processing scheme is that if the process does not invoke the stack frequently, and is not blocked waiting for a socket, then the event queue may not get processed in a timely fashion. This can be resolved by providing a kernel thread that is able process the event queue from time-to-time as necessary, as described in the applicant's co-pending PCT application no. PCT/GB06/002202. However, this mechanism may not always be capable of implementation in a way that is both efficient and timely, partly because it involves the use of an additional thread competing with applications for CPU time.

SUMMARY

According to a first aspect of the present invention there is provided a method for use in a data processing system connected to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the method comprising: deciding whether to permit the interrupts to be enabled, in dependence on the result of a determination as to the presence of current indications that the stack will be invoked by an entity in the data processing system to cause processing in accordance with the data transfer protocol of network events on the event queues.

According to a second aspect of the present invention there is provided a data processing system capable of connection to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the data processing system being capable of deciding whether to permit the interrupts to be enabled, in dependence on the result of a determination as to the presence of current indications that the stack will be invoked by an entity in the data processing system to cause processing in accordance with the data transfer protocol of network events on the event queues.

According to a third aspect of the present invention there is provided a computer program for use in a data processing system connected to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the computer program being capable of deciding whether to permit the interrupts to be enabled, in dependence on the result of a determination as to the presence of current indications that the stack will be invoked by an entity in the data processing system to cause processing in accordance with the data transfer protocol of network events on the event queues.

According to a fourth aspect of the present invention there is provided a data carrier bearing a computer program as set out above.

A network event may comprise: (i) an indication of completion of a requested transmission of data from the data processing system; (ii) an indication of receipt at the data processing system of data from the network; or (iii) an indication of a network error.

The data processing system may comprise a network interface for interfacing with the network, and the said interrupts may be issued by the network interface.

The stack may be capable of being invoked directly by an application supported by the data processing system.

Access to at least a part of the stack is preferably restricted by means of a lock, such that only one thread of execution may access the restricted part of the stack concurrently. The said determination may comprise checking the status of the lock to determine whether an application is currently accessing or attempting to access the restricted part of the stack. When the step of checking the status of the lock results in an indication that an application is currently accessing or attempting to access the restricted part of the stack, the said step of deciding preferably results in a decision not to permit interrupts to be enabled.

The method may further comprise the step of maintaining state to indicate whether interrupts are currently enabled. The said determination may comprise the step of checking the state to determine whether interrupts are currently enabled. When the step of checking the state results in an indication that interrupts are currently enabled, the said step of deciding preferably results in a decision not to permit interrupts to be enabled.

The data processing system may support application blocking, and processing in accordance with the data transfer protocol of network events in the event queues may cause waking of blocked applications associated with the network events on which the processing was performed. The said determination may comprise checking whether recent processing in accordance with the data transfer protocol of network events in the event queues caused the waking of any blocked applications. When the step of checking whether recent processing caused the waking of any blocked applications results in an indication that blocked applications were woken, the said step of deciding preferably results in a decision not to permit interrupts to be enabled.

The said entity may be an application process or a routine invoked in response to an interrupt.

According to a fifth aspect of the present invention there is provided a method for use in a data processing system connected by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the method comprising the steps of: receiving an enquiry from an application supported by the data processing system as to the status of at least one of the sockets; in response to receiving the enquiry, determining whether the interrupts are enabled in the data processing system; and in dependence on the result of the determination, deciding whether to perform processing in accordance with the data transfer protocol of network events on the event queues.

According to a sixth aspect of the present invention there is provided a data processing system capable of connection by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the data processing system being further capable of: receiving an enquiry from an application supported by the data processing system as to the status of at least one of the sockets; in response to receiving the enquiry, determining whether the interrupts are enabled in the data processing system; and in dependence on the result of the determination, deciding whether to perform processing in accordance with the data transfer protocol of network events on the event queues.

According to a seventh aspect of the present invention there is provided a computer program for use in a data processing system connected by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the data processing system being further capable of receiving an enquiry from an application supported by the data processing system as to the status of at least one of the sockets; and the computer program being capable of: in response to receipt of the enquiry at the data processing system, determining whether the interrupts are enabled in the data processing system; and in dependence on the result of the determination, deciding whether to perform processing in accordance with the data transfer protocol of network events on the event queues.

According to an eighth aspect of the present invention there is provided a data carrier bearing a computer program as set out above.

The method may further comprise the step of, in response to receiving the enquiry, checking the current status of at least one of the sockets and, in dependence on the result of the check deciding whether to block the application until a change occurs in the status of at least one of the sockets.

The said status is preferably an indicator of whether the at least one of the sockets is ready to receive data for transmission over the network or ready to provide to an application data received over the network.

When the result of the determination is positive, the step of deciding preferably results in a decision not to perform the said processing. Conversely, when the result of the determination is negative, the step of deciding preferably results in a decision to perform the said processing.

Access to at least a part of the stack is preferably restricted by means of a lock, such that only one thread of execution may access the restricted part of the stack concurrently. The step of deciding whether to perform the said processing may comprise checking the status of the lock to determine whether an application is currently accessing or attempting to access the restricted part of the stack. When the step of checking the status of the lock results in an indication that an application is currently accessing or attempting to access the restricted part of the stack, the step of deciding preferably results in a decision not to perform the said processing.

The said enquiry may be an enquiry from the group comprising poll( ), select( ), epoll( ) and GetQueuedCompletionStatus calls.

The method may further comprise the step of returning a response to the application indicating the status of the at least one of the sockets.

The method may further comprise the step of maintaining state indicating whether interrupts are currently enabled, and the step of determining may comprise checking the said state. When the step of checking the said state results in an indication that interrupts are currently enabled, the step of deciding preferably results in a decision not to perform the said processing.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 4:
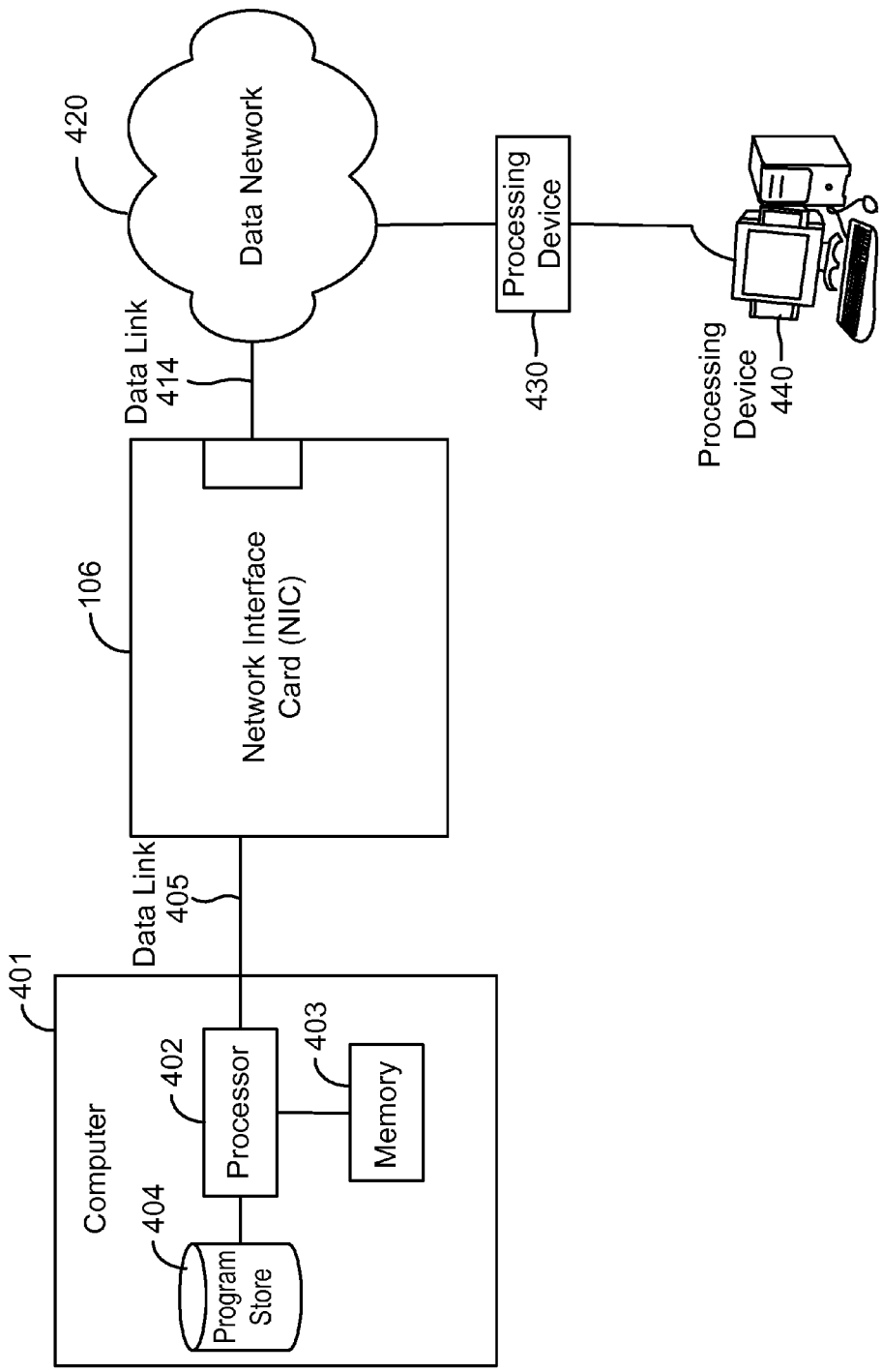
FIG. 4 is a schematic diagram of a network interface device in use.

FIG. 4 is a schematic diagram showing a network interface device such as a network interface card (NIC) and the general architecture of the system in which it may be used. The network interface device 6 is connected via a data link 405 to a processing device such as computer 401, and via a data link 414 to a data network 420. Further network interface devices such as processing device 430 are also connected to the network, providing interfaces between the network and further processing devices such as processing device 440.

The computer 401 may, for example, be a personal computer, a server or a dedicated processing device such as a data logger or controller. In this example it comprises a processor 402, a program store 404 and a memory 403. The program store stores instructions defining an operating system and applications that can run on that operating system. The operating system provides means such as drivers and interface libraries by means of which applications can access peripheral hardware devices connected to the computer. Drivers and libraries that are external to the operating system may also be provided.

A typical computer system 401 includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Figure 1:
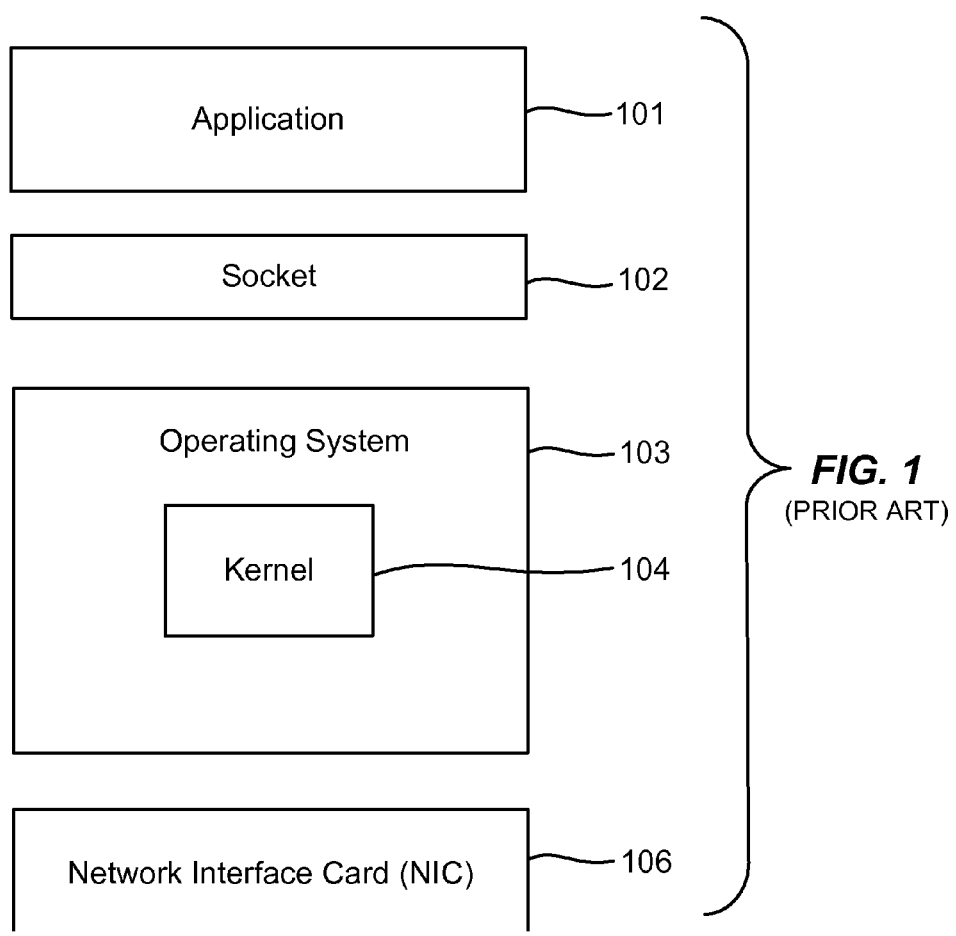
FIG. 1 shows a prior art computer system.
Figure 2:
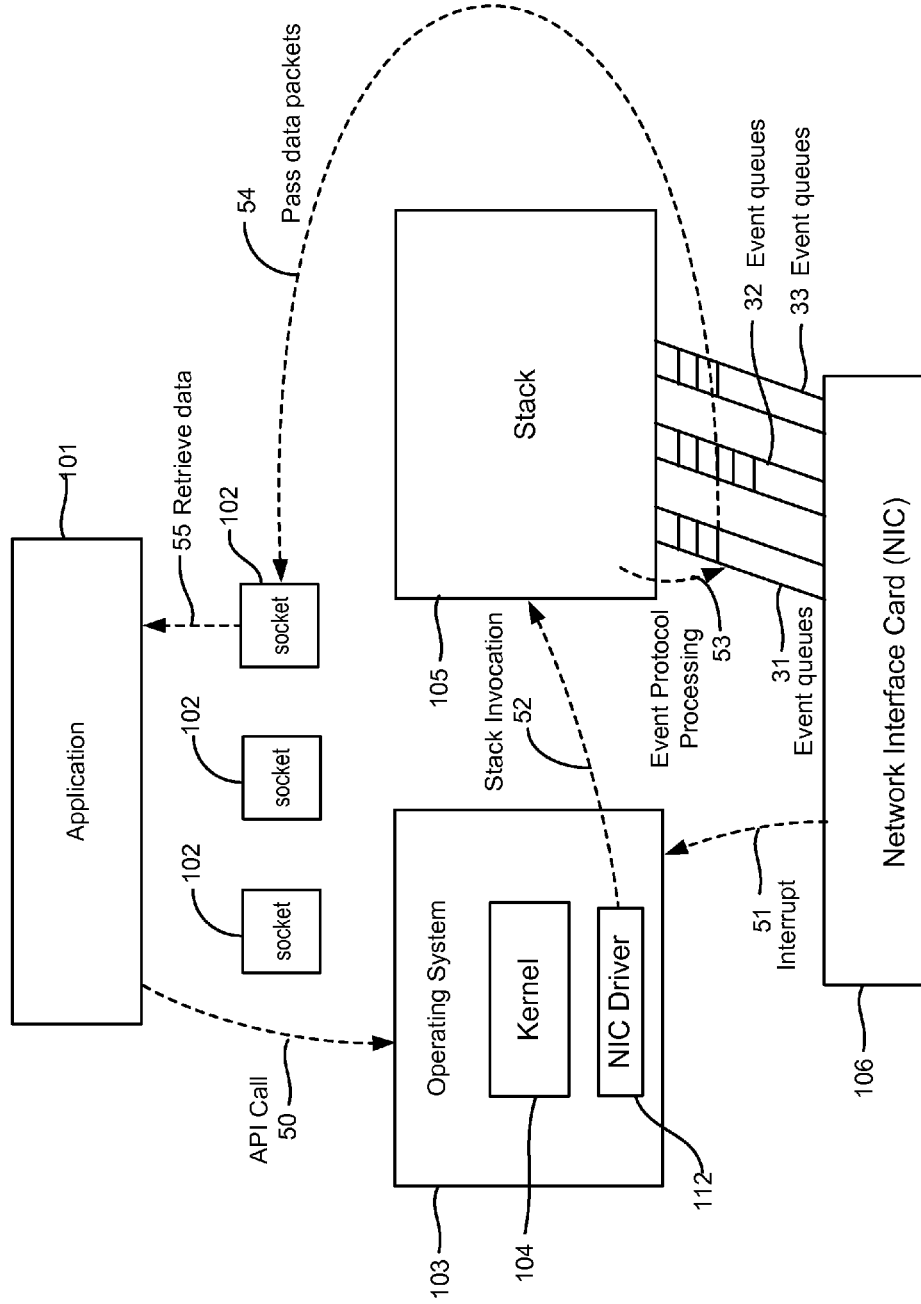
FIG. 2 shows a computer system for use with embodiments of the invention.

The exemplary system of FIG. 2 includes a computer system which may be in accordance with the system 401 of FIG. 4. In such a system, items 101, 102, 103, 104, 105, and 112 execute in response to software code portions as described below.

For a given stack, an event queue 1 is provided. However it is possible for one stack to manage a number of event queues. Since one stack is capable of supporting a large number of sockets 2, it can therefore occur that a single event queue contains data relating to a number of network endpoints, and thus a single event queue can contain data relating to a number of descriptors. Each application process in the data processing system can be associated with one or more sockets if it is involved in transferring data over the network, and can use one or more stacks.

Figure 3:
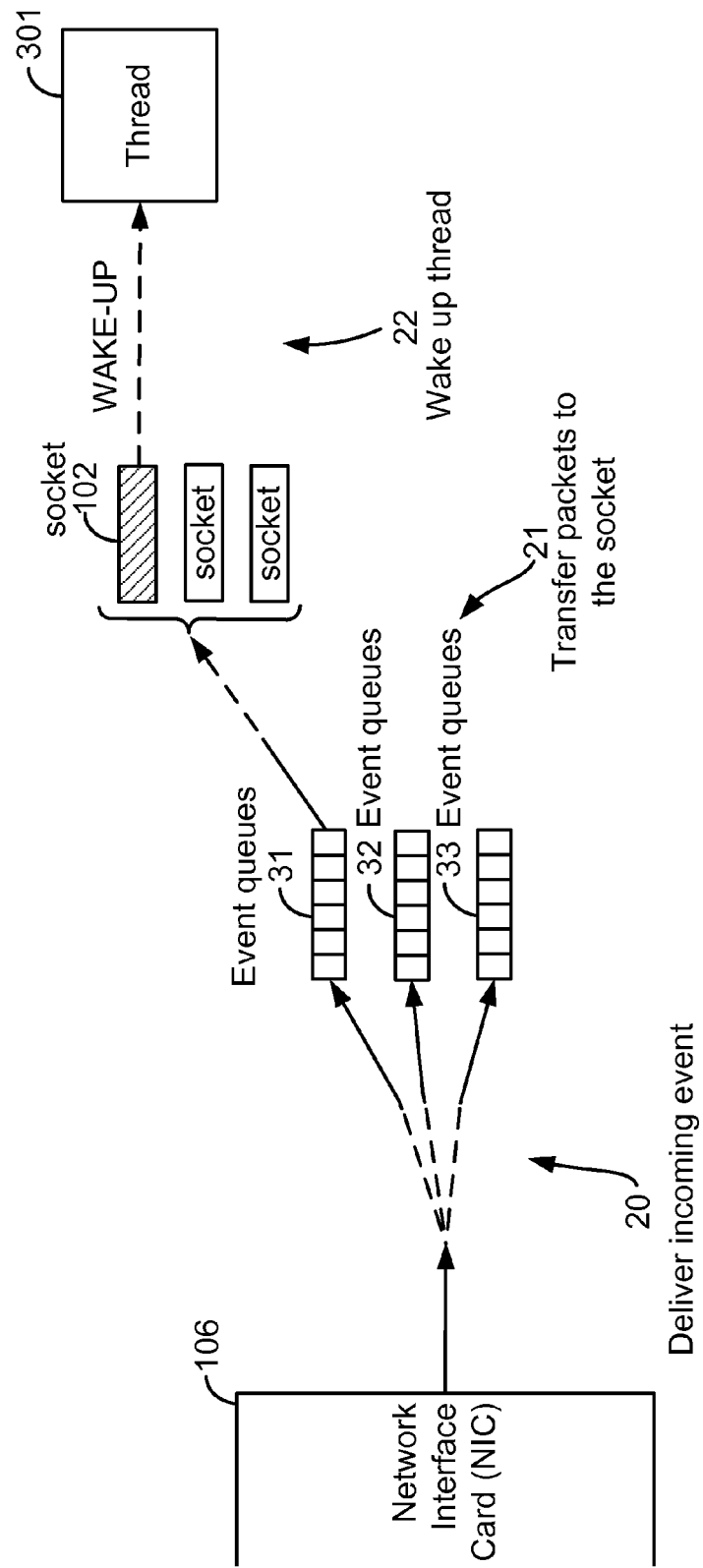
FIG. 3 shows the path of incoming data received at a computer system.

As mentioned in the introduction above, data arriving from the network at the NIC 6 is delivered into memory by the NIC, and a notification event is delivered to an event queue with which the data is associated. This step is indicated as 20 in FIG. 3. At some subsequent time, software in the stack 105 will perform network protocol processing on each received packet. The processing of events on the event queues is referred to hereafter as "updating the stack", since it results in any outstanding data in the event queues handled by the stack being processed. Updating the stack (step 21) causes received packets to be transferred to the appropriate socket 102. If the data in the event queue relates to more than one socket, then it will be demultiplexed onto the appropriate sockets.

When a thread wishes to receive data from a particular socket 2, it issues a recv( ) system call. For this call to operate correctly in general it is necessary that the stack first be brought up-to-date. That is, any events in the event queue must be handled so that received packets will be processed. As a result of the recv( ) call, any received data available in the socket will be copied into a buffer supplied by the application. If there is no new received data the thread may choose to block inside the recv( ) call until data arrives. Blocking while awaiting a given condition is a well-known occurrence in data processing systems, and in the preferred embodiment it comprises the following steps:

1) placing the thread in a wait-queue associated with the socket;

2) optionally setting state (for example a flag) to indicate that the wait-queue should be woken when the given condition (e.g. the arrival of new data at a socket) is met;

3) checking that the condition has not yet been met;

4) enabling interrupts for the event queue associated with the socket; and 5) putting the thread "to sleep"—the thread becomes inactive until the wait-queue is woken.

When the given condition occurs, the corresponding wait-queue is signalled, and any threads waiting on the wait-queue become runnable again, i.e. they begin competing for CPU time to carry out required processing. Thus, in the present example, when processed data appears at the relevant socket of the blocking thread 1a, the thread will be woken from its wait queue (step 22). Software in the stack 105 can be used to implement the wake-up of waiting threads. The thread 301 can then receive the data using a recv( ) call or similar.

The above implementation of a recv( ) call is suitable for an application-driven stack. It is desirable in this case for interrupts to be enabled before the thread is put to sleep to ensure that unprocessed events are not left unprocessed for an undue length of time while the application blocks. In an interrupt-driven stack the implementation of recv( ) differs only in that it is not first necessary to bring the stack up-to-date, and step 4) is not necessary, because interrupts are always enabled.

The above discussion uses the receipt of data from the network as an example. Corresponding considerations apply to the transmission of data over the network, as will be understood by a skilled person. Specifically, when a thread wishes to push data onto the network, it will first need to determine whether the relevant socket has available space in its transmit buffers so that the data can be passed by the thread to the buffers and then onto the network via the NIC. Thus, in the transmission case, a thread may block until there is sufficient space available in the socket's transmit buffers.

When a process carrying out networking tasks blocks, that process can no longer invoke the stack in order to process newly arrived data. Unprocessed data may therefore build up on the event queue, and this can be inefficient and cause the link to go idle as discussed above. In embodiments of the invention, measures are taken to ensure that incoming data can be processed while the process blocks or is descheduled. Specifically, interrupts are enabled (e.g. at step 4 of the blocking scheme given above) so that as soon as a network event occurs an interrupt service routine will run to enable prompt processing of the event queue by means of the stack.

However, it may not always be desirable to enable interrupts while a process is blocking because interrupts have a high overhead (as explained in the introduction) and it is possible that there may be another process capable of invoking the stack while the first process is blocking, or another blocking process may already have enabled interrupts for the same stack. In such cases, interrupts would be unnecessary and could therefore usefully be avoided.

Embodiments of the present invention can permit greater efficiency by making certain determinations as to the condition of the system and accordingly reducing the use of interrupts as far as possible. A number of techniques are used in this regard:

State (such as a flag) is set to indicate when interrupts are enabled. This can be queried to avoid multiple processes enabling interrupts concurrently for the same stack, which would lead to unnecessary overhead.

Checks are made as to whether the lock used to protect parts of the state of the shared stack is contended. The lock is conventionally implemented to prevent multiple processes from accessing the stack concurrently. If the lock is already being held by a process, then that suggests that the process has invoked (or is likely soon to invoke) the stack and cause processing of the event queue. In such a case, it would be unnecessary for a different process to enable interrupts in respect of the stack.

When a process capable of invoking the stack has just been woken from a blocked state, this is used as an indication that there is a process running, or about to be running, that will keep the stack up-to-date. Interrupts need not be enabled by another process in this situation.

The use of such techniques can provide a relatively low interrupt rate, while ensuring that the stack is kept up-to-date. Keeping the stack up-to-date at all times has the advantage that there is a low overhead for select( ), poll( ) and similar calls, because if there is no backlog of unprocessed data waiting on the event queue then a response can be issued relatively rapidly to such calls. Maintaining an up-to-date stack has the further advantage of enabling efficient network connections, since sockets' transmit buffers are emptied frequently, thereby enabling new data for transmission to be placed on the buffers, and incoming data is processed shortly after it arrives at the event queue so that the process for which it is intended can access it quickly.

Specific implementation details according to a preferred embodiment of the invention will now be discussed.

First, a modified blocking mechanism is used that only enables interrupts under certain conditions. A flag is maintained to indicate whether the lock protecting a part of the stack is currently being held, and this is queried during execution of the blocking mechanism. Specifically, step 4) of the blocking scheme described above includes the following two parts:

4a) checking the condition of the stack lock;
4b) only if the lock is unlocked, enabling interrupts for the event queue.

It is possible that while a first application is holding the lock to the protected part of the stack, further applications may be attempting to acquire the lock. Such a situation is referred to as lock contention, and the lock may be implemented so as to comprise an indicator of whether further applications are attempting to access the lock concurrently. In the preferred embodiment this indicator is implemented as a single bit of state to represent either "contended" or "uncontended".

In the situation where a first thread of an application is holding the lock while deciding whether to enable interrupts, for example before blocking, it can be useful for that first thread to know whether another thread will take up the lock when the first thread relinquishes it and blocks. If it knows that the lock is contended then the likelihood is that the stack will be invoked by one of the threads currently contending the lock and that protocol processing will be carried out promptly while the first thread blocks. Thus, in the case where a first thread already holds the lock, step 4b) could usefully be modified as follows:

4b) only if the stack lock is uncontended, enabling interrupts for the event queue.

In the preferred embodiment, the routine for handling interrupts ("interrupt service routine") is a part of the NIC driver 112 in the OS and has the following properties:

It ensures that when a new event arrives at the event queue, software will be invoked to bring the stack up-to-date. The act of updating the stack may cause one or more blocking processes to be woken, for example if data in a received packet is processed and passed to the process's socket, triggering a wake-up call.

It interprets such a waking of a process as an indication that there is currently no requirement for interrupts to be enabled, and accordingly does not re-enable interrupts. This is because the woken process is assumed to be seeking CPU allocation in order to invoke the stack in future, and there is therefore a process available to keep the stack up-to-date.

If no processes are woken as a result of the event queue processing phase, then it re-enables interrupts to ensure that action will be taken promptly in response to the next network event.

It checks the lock protecting the stack. If the lock is locked, it interprets this as an indication that there is a process currently invoking the stack. In this case it does not attempt to bring the stack up-to-date, and does not re-enable interrupts.

An exemplary interrupt service routine for achieving the above features is expressed in pseudo-code below:

```
nic_interrupt_service_routine(stack) {
    do_reenable_interrupts = false;
    if( trylock(stack) ) {
        update_stack(stack);
        unlock(stack);
        if( update_stack_did_not_wake_any_threads )
            do_reenable_interrupts = true;
    }
    if( do_reenable_interrupts )
        enable_interrupts(stack);
    else
        stack->interrupts_enabled = false;
}
```

The trylock operation in the interrupt service routine attempts to acquire the lock required for accessing the stack's event queue. If the lock is available it takes the lock, and if it is unavailable the operation returns false, and the stack is not brought up-to-date.

Operating systems provide a number of APIs to allow processes to manage multiple descriptors. In the multiple descriptor case, each descriptor may identify a socket or another type of resource. The APIs are used to allow a process to determine which among a set of file/socket descriptors are "ready" for I/O (i.e. have received data ready to be consumed, or are ready to transmit). They also typically provide a means to block until at least one of them becomes ready.

Certain known mechanisms such as GetQueuedCompletionStatus( ) are used on Microsoft Windows systems. On Unix systems multiple sockets are managed using APIs including select( ), poll( ) and epoll( ). These APIs are implemented by the operating system kernel: when a user process invokes an API call a system call is generated, which causes the CPU to switch to privileged mode and its control is passed to the kernel. A detailed example of code implementing a poll( ) system call is given in the Appendix below. In each case a set of file/socket descriptors is provided by the process. For each type of file/socket descriptor the kernel invokes a poll hook function in the subsystem that implements the file/socket. This hook must indicate the status of the file/socket (whether or not it is "ready") and must also link the thread to a wait-queue so that it will be woken when the file/socket becomes ready.

As explained above, in order to determine whether a given one of the sockets is ready it is necessary to ensure that the stack is up-to-date. To ensure that the responsible process will be woken promptly when a socket becomes ready it is necessary to ensure the stack will be kept up-to-date, so it is necessary to enable interrupts under certain conditions.

It is not possible to pass state between each invocation of the hook for each socket. This is because the API used for the hook function may be invoked concurrently by more than one thread. As a result, each socket has to be treated independently. However these operations incur significant CPU overhead if they are done on a per-socket basis. The preferred implementation of the invention is intended to minimise that overhead, especially when there are multiple sockets indicated in the set of file descriptors. A poll hook implementation for sockets is shown in terms of psuedo-code below:

```
1  socket_poll_hook(socket) {
2      stack = stack_of(socket);
3      if( interrupts_not_enabled(stack) ) {
4          do_enable_interrupts = true;
5          if( any_events_outstanding(stack) ) {
```

```
 6      if( trylock(stack) ) {
 7          /* The stack may not be up-to-date. The following brings
 8          ** the stack up-to-date by processing any network
 9          ** events. */
10          update_stack(stack);
11          unlock(stack);
12          if( update_stack_woke_any_threads )
13              do_enable_interrupts = false;
14      }
15      else
16          do_enable_interrupts = false;
17      }
18      if( do_enable_interrupts ) enable_interrupts(stack);
19   }
20   link_thread_to_wait_queue(current_thread, socket);
21   return readiness_of(socket);
22 }
```

Whenever the interrupt service routine runs and does not re-enable interrupts, the interrupt flag is cleared. By maintaining a flag in this way, quick checks can be made, for example in line 3 of the poll hook, as to whether interrupts are currently enabled. The flag can be used to efficiently implement select( ), poll( ) and epoll( ) API calls, since the poll hook is designed to update the stack only when interrupts are not enabled. This is useful because interrupts are only enabled when the stack has just been updated, so a positive determination that interrupts are enabled can be used as an indication that the stack is up-to-date. The poll hook therefore has low overhead when interrupts are enabled.

The preferred implementation also takes advantage of the fact that if many sockets are being managed then they are all likely to be in the same stack. Once the hook has run a first time, running it for second and subsequent sockets tends to be very quick because the test on line 3 of the socket_poll_hook( ) is likely to fail. This helps to keep overhead down.

FIG. 2 shows a series of steps summarizing the various features of the preferred embodiment described above. Step 50 illustrates an API call such as poll( ) being issued from an application process 101 to cause updating of the stack.

In response to the call from the application, the device driver 112 supporting the network hardware 6 invokes the stack 105 (step 52) to process events on the event queue (step 52). The stack then performs protocol processing of any events in the event queues 31-33 (step 53). In the preferred embodiment, events are notifications identifying incidents that have occurred in respect of the network connections of the computer system. They may include: (i) an indication that a requested transmission of a data packet over the network has been successfully completed; (ii) an indication of the arrival of data at the NIC; or (iii) an indication of a transmission or reception error (e.g. a erroneous packet received). In some implementations, such as where a user-level stack is used, it may be desirable to use additional events including timeouts and wake-ups.

After the events have been processed, packets of data are passed at step 54 to the relevant socket(s) 2. The preferred embodiment provides one socket for each network endpoint to which the computer is connected, although other implementations are possible within the scope of the invention. Similarly, the preferred embodiment uses a stack with one event queue per NIC in a system, although further stacks each with one or more event queues may be implemented if desired.

Once data is placed on the sockets 2 it can be retrieved by the application at step 55 by means of an API call such as recv( ).

Step 51 shows the alternative route for invoking the stack in the preferred embodiment. An interrupt is generated by the NIC and causes the CPU to save the context of the currently running process and switch to privileged mode to process the interrupt service routine implemented in the NIC driver 112. This causes the NIC driver to invoke the stack at step 52, and steps 52 to 55 can proceed as described above.

The preferred embodiment involves the generation of interrupts using an indirection. Specifically, the first event to arrive at an event queue following the enablement of interrupts causes a second event to be delivered to a particular event queue designated for interrupt triggering. The second event indicates the event queue at which the first event was received, and may be a wakeup event of type (v) mentioned above. The receipt at the designated event queue of an event of this type triggers an interrupt to be issued from the NIC to the OS, as shown in step 51 of FIG. 2. This indirect interrupt-triggering mechanism has the advantage that only one event queue needs to be configured for triggering interrupts, while the system as a whole can support a plurality of event queues for handling other network events. As an alternative, interrupts could be generated by the NIC directly in response to the receipt of an event at any of the event queues.

It should be noted that the stack 105 shown in FIG. 2 is accessible by the kernel in the preferred embodiment, but could alternatively or in addition be accessible directly by a user application by means of an appropriate call. User-level stacks are discussed in detail in the applicant's co-pending PCT applications WO2004/079981 and WO2005/104475. Embodiments of the invention could provide one stack for each application involved in networking tasks.

It will be appreciated that modifications of the techniques described herein may be made within the scope of the invention to achieve the overall advantage of reducing overhead in a networked data processing system. Similarly, other techniques involving the intelligent use of system conditions may be conceived which also lie within the scope of the invention.

It will also be understood that while TCP has been used herein as an example of a data transmission protocol, the principles of the invention are equally applicable to other protocols.

While the present invention has been described in the context of fully functioning data processing systems, those of ordinary skill in the art will appreciate that the processes described herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

APPENDIX

The following is simplified pseudo-code for the kernel's poll( ) system call, to show how it interacts with the subsystems that implement the file objects identified by file descriptors. poll( ) is invoked with an array "pfds", whose entries specify which file/socket descriptors the application is querying, and are also used to store the result (whether or not that file/socket is "ready").

```
poll_all(pfds) {
    int n_ready = 0;
    for( each pfd in pfds ) {
        file_obj = lookup_file(current_process, pfd->fd);
        pfd->ready = file_obj->subsystem->poll_hook(file_obj);
        if( pfd->ready ) n_ready = n_ready + 1;
    }
    return n_ready;
}
poll(pfds, timeout) {
    loop( forever ) {
        n_ready = poll_all(pfds);
        if( n_ready or nonblocking ) return n_ready;
        block_thread(timeout);
    }
}
```

First, poll( ) calls poll_all( ) to query the subsystem that implements each file/socket to determine whether any are already ready. If any are, or if this is a non-blocking call, it returns immediately. Otherwise it blocks until the thread is woken and then calls poll_all( ) again. The thread is woken when one of the files/sockets changes state. (This will usually, but not always, correspond to one of the files/sockets becoming ready)

This code is invoked by an application at user-level via a system call. The following is a highly simplified example of how a user-level application might use poll

```
/* We are interested in file descriptors 1 and 3. */
pfds[0]->fd = 1;
pfds[1]->fd = 3;
loop( forever ) {
    /* Block until at least one socket is ready. */
    poll(pfds, timeout);
    /* For each socket that is ready, receive some data. */
    for( i = 0; i < len(pfds); i = i + 1 )
        if( pfds[i]->ready )
            recv(pfds[i]->fd, buffer, len(buffer));
}
```

The invention claimed is:

1. A method for use in a data processing system connected to a network in accordance with a data transfer protocol, the data processing system having one or more event queues for holding notifications of network events, and being configured for responding to interrupts issued in response to the presence of a network event in the data processing system by invoking a stack to cause processing in accordance with the data transfer protocol of the network events, each network event associated with an event notification held on an event queue, the method comprising:

the data processing system deciding whether to permit the interrupts to be enabled, in dependence on the result of a determination as to the presence of current indications that the stack will be invoked by an application in the data processing system to cause processing in accordance with the data transfer protocol of network events, each network event associated with an event notification on an event queue, wherein:

access to at least a part of the stack, by a thread of execution responsive to an application system call, is restricted by means of a lock, such that only one thread of execution may access the restricted part of the stack concurrently;

said determination comprises checking the status of the lock to determine whether an application is currently accessing or attempting to access the restricted part of the stack; and wherein when said checking the status of the lock results in an indication that an application is currently accessing or attempting to access the restricted part of the stack, said deciding results in interrupts being disabled, and when said checking the status of the lock results in an indication that an application is not currently accessing or attempting to access the restricted part of the stack, said deciding results in interrupts being enabled.

2. A method according to claim 1 wherein a network event comprises a member of the group consisting of:
   (i) an indication of completion of a requested transmission of data from the data processing system;
   (ii) an indication of receipt at the data processing system of data from the network; and
   (iii) an indication of a network error.

3. A method according to claim 1 wherein the stack is capable of being invoked directly by an application supported by the data processing system.

4. A method according to claim 1 further comprising the step of maintaining state to indicate whether interrupts are currently enabled; wherein
   the said determination comprises the step of checking the state to determine whether interrupts are currently enabled; and
   when the step of checking the state results in an indication that interrupts are currently enabled, the said step of deciding results in interrupts being disabled.

5. A method according to claim 1 wherein the data processing system supports application blocking, and wherein processing in accordance with the data transfer protocol of network events, each network event associated with an event notification on an event queue, may cause waking of blocked applications associated with the network events on which the processing was performed, and wherein the said determination comprises checking whether recent processing in accordance with the data transfer protocol of network events, each network event associated with an event notification on an event queue, caused the waking of any blocked applications; and
   wherein, when the step of checking whether recent processing caused the waking of any blocked applications results in an indication that blocked applications were woken, the said step of deciding results in interrupts being disabled.

6. A data processing system comprising a processor coupled to a memory storing instructions that when executed by the processor cause the processor to perform:

connecting to a network in accordance with a data transfer protocol, the data processing system having one or more event queues for holding notifications of network events, and responding to interrupts issued in response to the presence of a network event in the data processing system by invoking a stack to cause processing in accordance with the data transfer protocol of network events, each network event associated with an event notification on an event queue;

the data processing system storing instructions that when executed by the processor decide whether to permit the interrupts to be enabled, in dependence on the result of a determination as to the presence of current indications that the stack will be invoked by an application in the data processing system to cause processing in accordance with the data transfer protocol of network events, each network event associated with an event notification on an event queue, wherein:

access to at least a part of the stack, by a thread of execution responsive to an application system call, is restricted by means of a lock, such that only one thread of execution may access the restricted part of the stack concurrently;

said determination comprises checking status of the lock to determine whether an application is currently accessing or attempting to access the restricted part of the stack; and wherein when said checking the status of the lock results in an indication that an application is currently accessing or attempting to access the restricted part of the stack, said deciding results in interrupts being disabled, and when said checking the status of the lock results in an indication that an application is not currently accessing or attempting to access the restricted part of the stack, said deciding results in interrupts being enabled.

7. A non-transitory computer readable storage medium having stored thereon a plurality of software code portions for execution by a data processing system connected to a network in accordance with a data transfer, the data processing system having one or more event queues for holding notifications of network events, and being configured for responding to interrupts issued in response to the presence of a network event in the data processing system by invoking a stack to cause processing in accordance with the data transfer protocol of the network events, each network event associated with an event notification held on an event queue;

wherein the code portions, when executed by the data processing system, decide whether to permit the interrupts to be enabled, in dependence on the result of a determination as to the presence of current indications that the stack will be invoked by an application in the data processing system to cause processing in accordance with the data transfer protocol of network events, each network event associated with an event notification on an event queue, wherein:

access to at least a part of the stack, by a thread of execution responsive to an application system call, is restricted by means of a lock, such that only one thread of execution may access the restricted part of the stack concurrently;

said determination comprises checking the status of the lock to determine whether an application is currently accessing or attempting to access the restricted part of the stack; and wherein when said checking the status of the lock results in an indication that an application is currently accessing or attempting to access the restricted part of the stack, said deciding results in interrupts being disabled, and when said checking the status of the lock results in an indication that an application is not currently accessing or attempting to access the restricted part of the stack, said deciding results in interrupts being enabled.

8. A method for use in a data processing system connected by means of one or more sockets to a network in accordance with a data transfer protocol, the data processing system having one or more event queues for holding notifications of network events, each network event being associated with at least one of the sockets, and the data processing system being configured for responding to interrupts issued in response to the presence of a network event in the data processing system by invoking a stack to cause processing in accordance with the data transfer protocol of the network events, each network event associated with an event notification held on an event queue, wherein such processing can cause a change in a status of one or more of the sockets, wherein access to at least a part of the stack, by a thread of execution responsive to an application system call, is restricted by means of a lock, such that only one thread of execution may access the restricted part of the stack concurrently, the method comprising the steps of:

receiving an enquiry from an application supported by the data processing system as to the status of at least one of the sockets, wherein said status is an indicator of whether at least one of the at least one of the sockets is ready to receive data for transmission over the network or ready to provide to an application data received over the network;

in response to receiving the enquiry, determining whether the interrupts are enabled in the data processing system;

checking the status of the lock to determine whether an application is currently accessing or attempting to access the restricted part of the stack; and in dependence on the result of the determination, deciding whether to perform processing in accordance with the data transfer protocol of network events, each network event associated with an event notification on an event queue, wherein:

when the result of the determination is that the interrupts are enabled, said processing is not performed; and when the result of the determination is that the interrupts are disabled and when the step of checking the status of the lock results in an indication that an application is not currently accessing or attempting to access the restricted part of the stack, said processing is performed.

9. A method according to claim 8 further comprising the step of, in response to receiving the enquiry, checking the current status of at least one of the sockets and, in dependence on the result of the check deciding whether to block the application until a change occurs in the status of at least one of the sockets.

10. A method according to claim 8 wherein the stack is capable of being invoked directly by the application.

11. A method according to claim 8, further comprising the step of returning a response to the application indicating the status of the at least one of the sockets.

12. A method according to claim 8 wherein a network event comprises a member of the group consisting of:

(i) an indication of completion of a requested transmission of data;

(ii) an indication of receipt at the data processing system of data from the network; and (iii) an indication of a network error.

13. A method according to claim 8, further comprising the step of maintaining state indicating whether interrupts are currently enabled; wherein the step of determining comprises checking the said state; and when the step of checking the said state results in an indication that interrupts are currently enabled, the step of deciding results in a decision not to perform the said processing.

14. A data processing system comprising a processor coupled to a memory storing instructions that when executed by the processor cause the processor to perform:

connecting by means of one or more sockets to a network in accordance with a data transfer protocol, the data processing system having one or more event queues for holding notifications of network events, each network event being associated with at least one of the sockets, and the data processing system being configured for responding to interrupts issued in response to the presence of a network event in the data processing system by invoking a stack to cause processing in accordance with the data transfer protocol of network events, each network event associated with an event notification on an event queue, wherein such processing can cause a change in a status of one or more of the sockets, wherein access to at least a part of the stack, by a thread of execution responsive to an application system call, is restricted by means of a lock, such that only one thread of execution may access the restricted part of the stack concurrently, the data processing system further storing instructions to:

receive an enquiry from an application supported by the data processing system as to the status of at least one of the sockets, wherein said status is an indicator of whether at least one of the at least one of the sockets is ready to receive data for transmission over the network or ready to provide to an application data received over the network;

in response to receiving the enquiry, determine whether the interrupts are enabled in the data processing system;

checking the status of the lock to determine whether an application is currently accessing or attempting to access the restricted part of the stack; and in dependence on the result of the determination, decide whether to perform processing in accordance with the data transfer protocol of network events, each network event associated with an event notification on an event queue, wherein:

when the result of the determination is that the interrupts are enabled, said processing is not performed; and when the result of the determination is that the interrupts are disabled and when the step of checking the status of the lock results in an indication that an application is not currently accessing or attempting to access the restricted part of the stack, said processing is performed.

15. A non-transitory computer readable storage medium having stored thereon a plurality of software code portions for execution by a data processing system connected by means of one or more sockets to a network in accordance with a data transfer protocol, the data processing system having one or more event queues for holding notifications of network events, each network event being associated with at least one of the sockets, and the data processing system being configured for responding to interrupts issued in response to the presence of a network event in the data processing system by invoking a stack to cause processing in accordance with the data transfer protocol of the network events, each network event associated with an event notification held on an event queue, wherein such processing can cause a change in a status of one or more of the sockets, wherein access to at least a part of the stack, by a thread of execution responsive to an application system call, is restricted by means of a lock, such that only one thread of execution may access the restricted part of the stack concurrently, the data processing system being further capable of receiving an enquiry from an application supported by the data processing system as to the status of at least one of the sockets, wherein said status is an indicator of whether at least one of the at least one of the sockets is ready to receive data for transmission over the network or ready to provide to an application data received over the network; wherein the code portions, when executed by the data processing system, perform the steps of:

in response to receipt of the enquiry at the data processing system, determining whether the interrupts are enabled in the data processing system;

checking the status of the lock to determine whether an application is currently accessing or attempting to access the restricted part of the stack; and in dependence on the result of the determination, deciding whether to perform processing in accordance with the data transfer protocol of network events, each network event associated with an event notification on an event queue, wherein:

when the result of the determination is that the interrupts are enabled, said processing is not performed; and when the result of the determination is that the interrupts are disabled and when the step of checking the status of the lock results in an indication that an application is not currently accessing or attempting to access the restricted part of the stack, said processing is performed.

16. A method for processing network events on event queues in a data processing system connected to a network in accordance with a data transfer protocol, the method comprising:

causing enablement or disablement of interrupts that are issued in response to the presence of a network event, by:

providing a lock that permits no more than a single thread of execution to concurrently access a restricted portion of a stack that processes network events in accordance with the data transfer protocol, each of the network events being associated with an event notification held on an event queue of one or more event queues in the data processing system, determining based on the status of the lock whether or not a thread of execution is currently accessing the restricted portion of the stack or waiting to access the restricted portion of the stack;

responsive to determining that a thread of execution is accessing the restricted portion of the stack or is waiting to access the restricted portion of the stack, causing interrupts to be disabled, wherein at least one of the threads of execution accessing or waiting to access the restricted portion of the stack has invoked the stack responsive to an application system call;

responsive to determining that no thread is accessing the restricted portion of the stack or waiting to access the restricted portion of the stack, causing interrupts to be enabled.

* * * * *